United States Patent [19]

Haberstroh

[11] Patent Number: 4,848,950
[45] Date of Patent: Jul. 18, 1989

[54] PROTECTIVE COVER FOR FLEXIBLE JOINT

[75] Inventor: Robert W. Haberstroh, Farmington Hills, Mich.

[73] Assignee: Ford Motor Company, Dearborn, Mich.

[21] Appl. No.: 249,016

[22] Filed: Sep. 26, 1988

[51] Int. Cl.⁴ .............................................. B65D 59/00
[52] U.S. Cl. ........................................ 403/12; 403/23; 403/134
[58] Field of Search .................... 403/11, 23, 134, 12; 277/9.5, 11

[56] References Cited

U.S. PATENT DOCUMENTS 3,199,902 8/1965 Fierstine .
3,598,434 8/1971 Patton et al. .
4,552,480 11/1985 McIntyre .

Primary Examiner—Andrew V. Kundrat
Attorney, Agent, or Firm—Jerome R. Drouillard; Roger L. May

[57] ABSTRACT

A protective cover for a flexible joint having a socket member with a cavity, a stud having a free end projecting from the cavity and a seal engaged with the socket member and the stud includes a first generally tubular section having a frangible plug situated therein with the tubular section and the plug being adapted for encasing the free end of the stud and a second generally tubular section integral with the first tubular section comprising a tubular base with an expandable skirt adapted for encasing the seal.

14 Claims, 3 Drawing Sheets

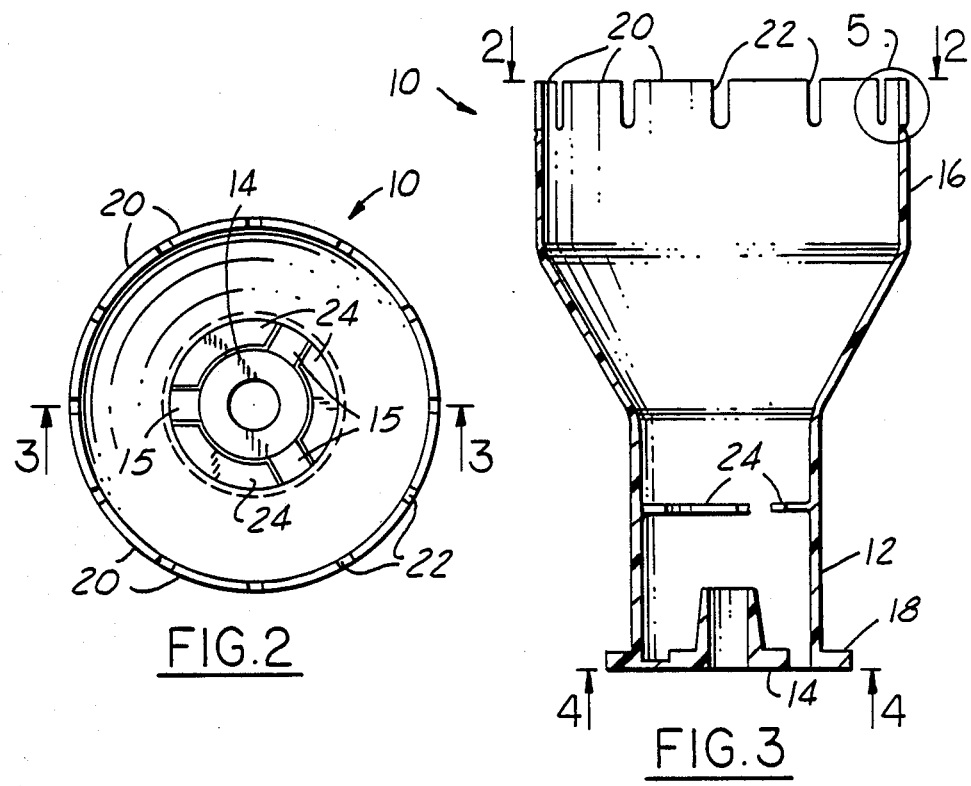
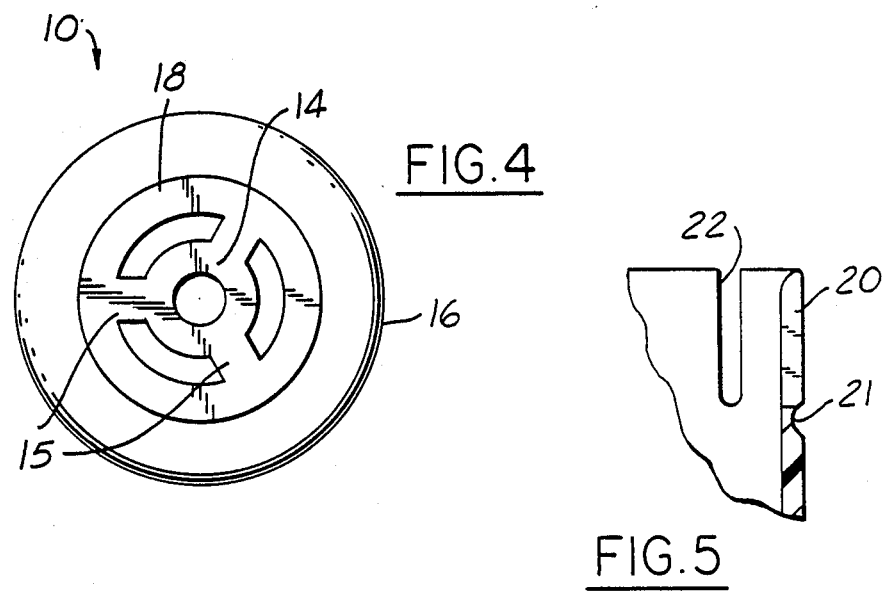

PROTECTIVE COVER FOR FLEXIBLE JOINT

BACKGROUND OF THE INVENTION

1. Field of the Invention

This invention relates to a protective cover for a flexible joint such as an automotive ball joint.

2. Disclosure Information

Flexible joints are used in a variety of vehicles and other types of mechanisms. One commonly employed type of flexible joint is the so-called ball joint in which a stud having a spherical or semispherical head at one end protrudes from a socket which is mounted to a linkage or to some other movable component. The ball and socket are protected from internal contamination by means of a flexible boot seal which is fixed to the stud and to the socket. Such ball joints are commonly used in the suspensions and steering linkages of automotive vehicles and have been so used for decades.

For a long period following initial employment of ball joints in automotive vehicles, such joints were commonly provided with grease fittings allowing the joint to be lubricated periodically so as to prolong the life of the joint. In recent years, however, the trend has been, at least in the automotive industry, toward provision of suspension and steering joints which do not require periodic maintenance. Such joints do, however, require sealing structures having sufficient integrity to exclude environmental contamination from the joint, it being understood by those skilled in the art that environmental contamination will quickly cause failure of an otherwise sound joint.

It has been determined that automotive ball joints of the type used for steering and suspension linkages frequently fail due to damage incurred by the seal during the processing and subsequent shipping of the joints and of the components or subassemblies into which the joints are assembled.

The processing of ball joints and suspension control arms employing such joints usually involves several steps. In the first step, the ball joint itself is assembled and then stored for an indeterminate period of time, during which time the ball joint may be shipped to another location prior to assembly into a control arm. During the initial storage and shipping of the ball joint, the joints are usually stored in bins. This storage presents an opportunity for the boot seal of the ball joint to be cut or torn by the threaded studs protruding from other ball joints contained in the same bin. In the event that the ball joint survives the initial shipping and handling with the boot seal element intact, yet other opportunities exist for the seal to be damaged. For example, after installation of the ball joint into a suspension control arm, the arm assemblies will be placed in other bins or baskets and moved to the vehicle assembly plant. During the subsequent shipping and handling further opportunity exists for the ball joint boot seals to become damaged because the seals may be cut or abraded by the stud portions of the ball joints themselves or by sharp edges formed on the control arms, which may weigh 15–20 lbs, or more.

The boot seal is not the only element of the ball joint which is susceptible to shipping and handling damage. U.S. Pat. Nos. 3,199,902 and 3,598,434 disclose protective devices intended to prevent damage to the threads of ball joints while at the same time retaining a seal upon the joint. Although the protectors disclosed in these patents will protect the ball joints' threads from damage, neither serves to protect the seal from damage during shipping and handling prior to installation of the ball joint upon a vehicle. U.S. Pat. No. 4,552,480 discloses a ball socket and member having a skirt at its open end which is adapted to form a seal with a member carrying the ball so as to prevent leakage or contamination of lubricant contained within the body cavity. No mechanism is disclosed, however, in the '480 patent for protecting the skirt from damage.

It is known in the prior art to provide a protective cover for a flexible joint in which the cover comprises two tubular sections without either a flexible skirt depending from the larger of the two tubular sections as shown in the present invention, and further without having a stop abutment plug situated within the protective cover for the purpose of controlling the extent to which the cover is engaged upon the ball joint or other flexible joint. The importance of these features will be explained in this specification.

It is an object of the present invention to provide a protective cover for a flexible joint, such as an automotive ball joint, which will prevent damage to the threaded portion of the ball joint stud while protecting the joint's boot seal, not only after the ball joint is assembled, but also after a control arm assembly or other component including the ball joint has been assembled.

It is a further object of the present invention to provide a protective cover for a flexible joint which is compatible with current systems employed for inserting ball joints into control arms.

It is an advantage of the present invention that the present protective cover for a flexible joint will protect such a joint even if the joint is rotated or knocked to an off-center position.

It is an advantage of the present invention that a protective cover for a flexible joint according to this invention will prevent damage to both the threaded and boot seal portions of the ball joint, both before and after the ball joint is installed into a vehicle control arm, and indeed at all times until the control arm itself has been installed in a vehicle.

It is a further advantage of the present invention that a protective cover for a flexible joint according to this invention may be easily employed during the production process.

Other objects, features and advantages of the Present invention will become apparent to the reader of this specification.

SUMMARY OF THE INVENTION

According to the present invention, a protective cover for a flexible joint having a socket member with a cavity, a stud having a free end projecting from the cavity, and a seal engaged with the socket member and with the stud, comprises a first generally tubular section having a frangible plug situated therein, with said tubular section and said plug being adapted for encasing the free end of the stud, and with the plug limiting the extent to which the cover may be engaged with said joint. The protective cover further comprises a second generally tubular section which is integral with the first tubular section and which comprises a tubular base with an expandable skirt adapted for encasing such seal. The expandable skirt may comprise a plurality of segments mounted about the circumference of said tubular base such that each of the segments is free to move radially outward from the tubular base. This radial movement may be facilitated by mounting each of the skirt elements by means of a hinge to the tubular base.

An automotive suspension joint according to the present invention may comprise a socket member including a cavity, a stud having a free end projecting from the cavity and having a head contained within the cavity, a seal engaged with the socket member and with the stud, and a protective cover extending over both the stud and the seal, with the protective cover being movable between a first position defined by the interference of a stop abutment contained within the cover with the free end of the stud, and a second position defined by the abutment of a tubular portion of the protective cover with said seal. The protective cover may comprise a first tube section having a plug comprising said stop abutment positioned therein, with the tube and the plug being adapted for engagement with the stud protruding from the cavity of the ball joint, and a second tube section attached to the first tube section and comprising a tubular base having a flexible, expandable skirt hinged thereto.

According to yet another aspect of the present invention, a method for utilizing a protective cover in conjunction with an automotive suspension control arm and a joint having a stud with the free end projecting from a cavity and a seal between the cavity and the stud, comprises the steps of (i) installing such protective cover upon the joint, in a first position defined by the engagement of a stop abutment incorporated in the protective cover with such stud, at the time the joint is assembled and (ii) overriding said stop abutment so as to reposition said protective cover upon said joint in a second position defined by the engagement of a seal protection portion of said cover with said seal when said joint is assembled into said suspension control arm. A protective cover according to the present invention thus extends over both the stud and the seal of a flexible joint in such manner that the second section of the protective cover, comprising an expandable skirt adapted to splay outwardly about a portion of the ball joint's socket and seal when the protective cover is engaged with a sufficient length of the stud, will be deployed in such splayed manner when said frangible plug is separated from the first section of the protective cover.

BRIEF DESCRIPTION OF THE DRAWINGS

FIG. 2 is an end view of a protective cover according to the present invention taken along the line 2—2 of FIG. 3.

FIG. 3 is a full longitudinal cross section of a protective cover according to the present invention.

FIG. 4 is an end view of a protective cover according to the present invention taken along the line 4—4 of FIG. 3.

FIG. 5 is an exploded view of the skirt section of a protective cover according to the present invention taken from the circled area labeled "5" of FIG. 3.

DETAILED DESCRIPTION OF THE PREFERRED EMBODIMENTS

Figure 1:
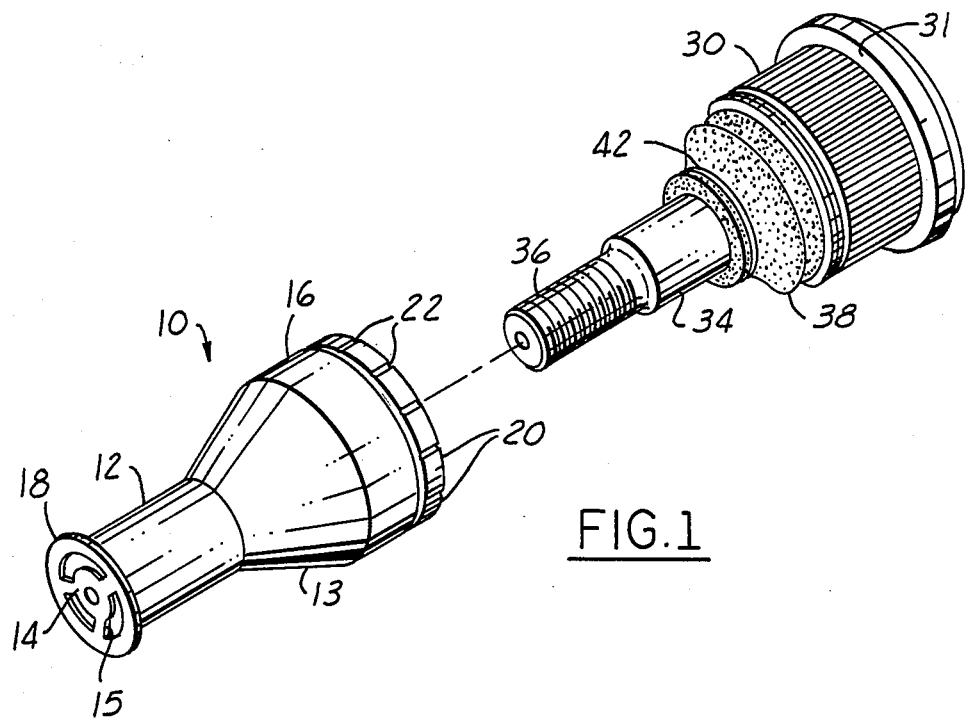
FIG. 1 is a perspective view of a flexible joint and a protective cover according to the present invention.

FIG. 1 illustrates a protective cover and a flexible joint, in this case a ball joint, according to the present invention. The protective cover may be formed from molded polyethylene or other nonmetallic or metallic or composite materials known to those skilled in the art and suggested by this disclosure. Protective cover 10 comprises first generally tubular section 12 which is illustrated in this case as a right circular cylinder having a flange, 18, at one end, and being joined to a frustro-conical section, 13, at its other end. Frustro-conical section 13 extends between first generally tubular section 12 and a tubular base, 16, which may comprise a circular cylinder of larger diameter than the first tubular section. The end of tubular base 16 which is not joined to frustro-conical section 13 has a plurality of skirt segments 20 hinged thereto. Each of the skirt segments is separated by a slot 22 which allow the skirt segments to flex independently of each other. The importance of this flexibility will be described at a later point in this specification. FIG. 1 also shows the component parts of a flexible joint, which is illustrated as a ball joint, of a type suitable for protection by a cover according to the present invention. Those skilled in the art will appreciate in view of this disclosure that a protective cover according to this invention is suitable for use with other types of flexible joints in addition to the illustrated ball joint. The ball joint comprises socket member 30 having an internal cavity 32 (FIG. 6) and an external shoulder 31 which serves as an abutment for controlling the maximum extent of engagement of the ball joint with the control arm or other linkage into which the ball joint is mounted (see FIGS. 7 and 8). The ball joint further includes stud 34, which projects from cavity 32 (FIG. 6) and which has threads 36 formed on the free end of the stud.

Figure 6:
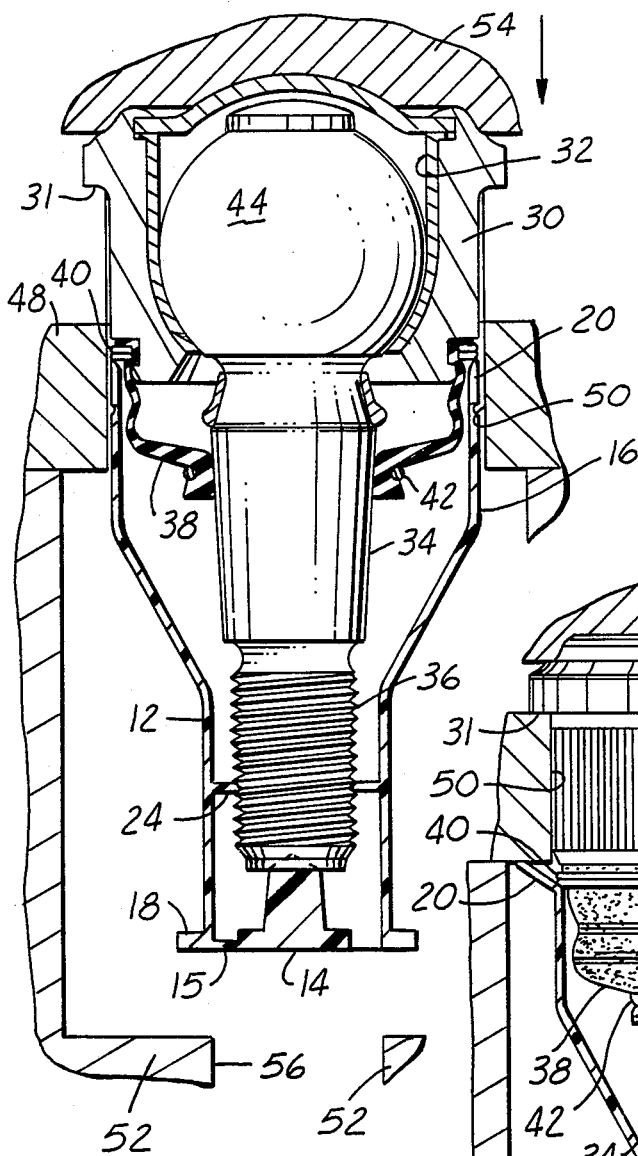
FIG. 6 illustrates the placement of a flexible joint and protective cover and control arm within an installation fixture serving to force the ball joint into a bore provided within the control arm.
Figure 7:
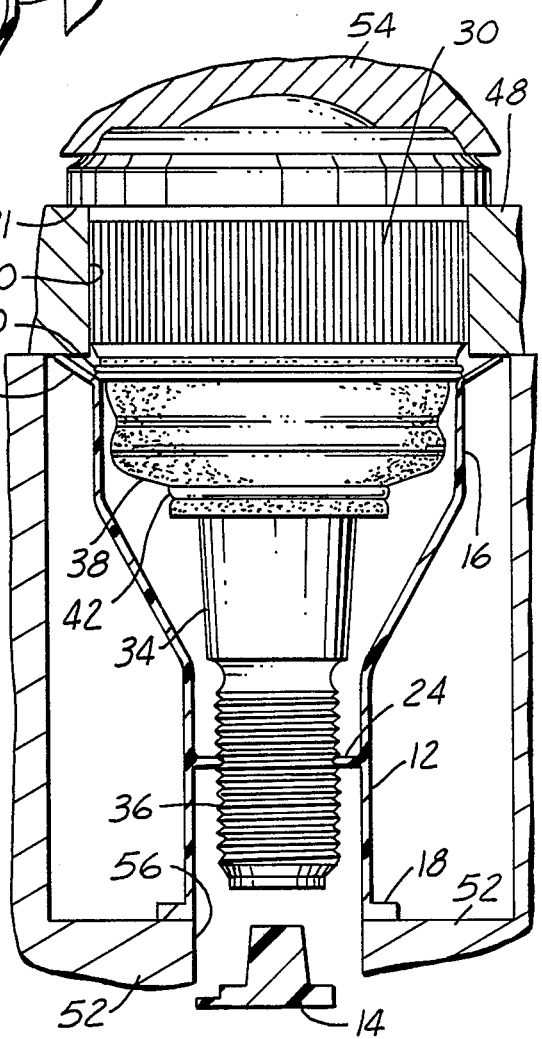
FIG. 7 illustrates the position of a ball joint and protective cover with respect to a control arm following installation of the ball joint into the control arm.

Seal 38 comprises an important part of the ball joint assembly. As shown in FIGS. 6 and 7, seal 38 comprises a flexible boot seal which is maintained in contact with socket member 30 and stud 34 by means of lower seal retainer 40 and upper seal retainer 42. The purpose of seal 38 is, of course, to exclude environmental contamination from the ball joint cavity and to retain lubricant within the cavity. Those skilled in the art will appreciate in view of this disclosure that seal 38 will be able to perform the functions ascribed to the seal only if the seal maintains its integrity. In other words, if the seal becomes cut or ripped, the lubricant will be lost and environmental contamination will quickly cause failure of the ball joint. The present cover effectively prevents such damage from occurring during processing of the ball joint because of the unique control and protective features incorporated into the cover. These features function as follows. A plurality of teeth, 24 (FIGS. 2, 3, 6 and 7), retain protective cover 10 on the ball joint assembly by engaging the threaded portion 36 of stud 34. The axial positioning of protective cover 10 with respect to the ball joint assembly is, however, determined by two separate features of the cover. In the first case, frangible plug 14, which comprises a stop abutment, and which is contained within first generally tubular section 12 (FIGS. 1, 2, 3, 4, and 6) allows the protective cover to be axially engaged with the ball joint assembly only to the point at which frangible plug 14 comes into contact with the free end of stud 36 (FIG. 6). When protective cover 10 has been engaged with the ball joint assembly to the point at which frangible plug 14 is in abutting contact with the free end of stud 34, skirt segments 20, which are shown in enlarged detail in FIG. 5, will rest against lower seal retainer 40 without protruding radially beyond the lower seal retainer. This will allow the ball joint assembly and the cover to be assembled into a control arm without any interference from the protective cover. A similar protective cover found in the prior art but without frangible plug 14 sometimes becomes caught between the control arm or other linkage into which the ball joint was being assembled because the cover had been engaged with the ball joint to a greater extent than was permissible. Frangible plug 14 prevents such extensive engagement of the protective cover and the ball joint unless and until the plug is itself broken out of the end of first generally tubular section 12. The separation of frangible plug 14 from tubular section 12 is permitted by means of webs 15 which are shown in FIGS. 2, 3, 4 and 6. Although three webs are shown those skilled in the art will appreciate in view of this disclosure that any suitable number could be employed for the purpose of practicing this invention.

Figure 8:
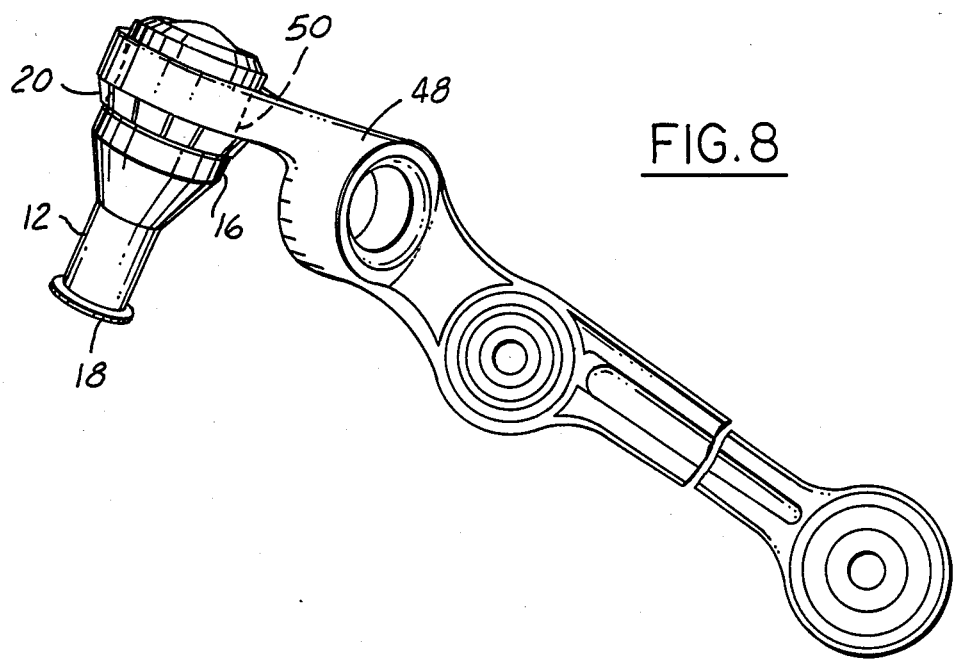
FIG. 8 is a perspective view illustrating the completed control arm and ball joint assembly including the present protective cover. Note in FIG. 8 that skirt elements 20 have splayed out into contact with the control arm in such fashion that the boot seal of the ball joint is protected even in the event that the ball joint stud is rotated or knocked into an off center position.

The second protective feature of the cover according to the present invention is illustrated in detail in FIGS. 5, 7 and 8. As shown in FIG. 5, each of skirt segments 20 is separated from the adjoining skirt segments by means of a slot 22. Each segment is hinged at hinge region 21 to the balance of tubular base 16. Hinge region 21 comprises an section having reduced material thickness (FIG. 5). Bending stresses imposed upon skirt segments 20 thereby cause bending of the present cover at regions 21. Because the skirt segments are caused to bend at hinge region 21, the skirt segments deploy into a splayed position at the time the ball joint assembly is inserted into the control arm or other linkage. This insertion is shown in FIGS. 6 and 7. In FIG. 6, the ball joint assembly is shown as having been preliminarily inserted into bore 50 formed within control arm 48. The ball joint is provided with serrations about the outer diameter of the socket number for the purpose of aiding the retention of a ball joint with bore 50. In conventional fashion, the ball joint assembly is pressed into place by means of ram 54 while control arm 48 is being supported by anvil 52. As shown in FIG. 6, at the beginning of the insertion process flange 18 extends some distance from the base portion of anvil 52, which has port 56 formed therein. However, when the ball joint, as shown in FIG. 7 is fully pressed into position within control arm 48, frangible plug 14 is simultaneously pushed out of tubular section 12 and through port 56 and protective cover 10 is forced to relocate with respect to the ball joint so that it is further engaged with the ball joint assembly. This causes skirt segments 20 to splay outwardly as shown in FIGS. 7 and 8 as the skirt elements ride over lower seal retainer 40.

Because the skirt elements are individually hinged to tubular base 16, a protector according to the present invention is able to prevent damage to the boot seal even in the event that the stud is knocked or rotated to an off-center position prior to installation of the control arm or other device upon an automobile or other machine. In effect, each skirt functions as a movable shield to protect a small segment of the boot seal. Accordingly, unlike prior art protective devices which do not compensate for misalignment of stud 34 with the socket portion of the joint, skirt segments 20 of a protector according to the present invention will serve to prevent damage to seal 38 even in the event that stud 34 becomes cocked or knocked out of the position shown in FIGS. 6 and 7.

Those skilled in the art will appreciate in view of this disclosure that a protective cover according to the present invention will prevent damage to not only the threads of a ball joint assembly but also the seal of a ball joint during not only the initial processing of the ball joint before it is assembled into a control arm or other linkage, but also following assembly of the ball joint into the control arm, and indeed, this protection will continue until the control arm is assembled into a vehicle. As a result, a protective cover according to the present invention will prevent the loss of expensive ball joint and control arm assemblies due to torn or punctured seals. A protective cover according to the present invention will produce further economy because the precise positioning of the cover upon the flexible joint will allow the joint to be assembled into a control arm or other component without the cover becoming captured between the joint and the component into which it is being inserted.

Various modifications will, no doubt, occur to those skilled in the arts to which this invention pertains. For example, the cross sectional configuration of the tubular segments comprising a protective cover according to this invention may be modified according to differing requirements. Similarly, the precise design of frangible plug 14 or skirt segments 20 may be adapted to the situation at hand. These and all other variations which basically rely on the teachings with which this disclosure has advanced the art are properly considered within the scope of this invention as defined by the appended claims.

I claim:

1. A protective cover for a flexible joint having a socket member with a cavity, a stud having a free end projecting from the cavity, and a seal engaged with said socket member and said stud, said cover comprising:
    a first generally tubular section having a frangible plug situated therein, with said tubular section and said plug being adapted for encasing the free end of said stud, with said plug limiting the extent to which said cover may be engaged with said joint; and
    a second generally tubular section, integral with said first tubular section, comprising a tubular base with an expandable skirt adapted for encasing said seal.

2. A protective cover for a joint according to claim 1, wherein said expandable skirt comprises a plurality of segments mounted about the circumference of said tubular base such that each of said segments is free to move radially outward from said tubular base.

3. A protective cover for a joint according to claim 2 wherein each of said skirt segments is hinged to said tubular base.

4. A protective cover for a joint according to claim 1, wherein said flexible joint comprises a ball joint.

5. An automotive suspension joint, comprising:
    a socket member including a cavity;
    a stud having a free end projecting from said cavity and having a head contained within said cavity;

a seal engaged with said socket member and said stud; and a protective cover extending over both said stud and said seal and having a frangible stop abutment, with said protective cover being movable between a first axial position defined by the interference of said stop abutment contained within said cover with the free end of said stud, and a second position defined by the abutment of a tubular portion of said protective cover with said seal.

6. An automotive suspension joint according to claim 5, wherein said protective cover comprises:

a first tube section, having a plug comprising said stop abutment positioned therein, with said tube and said plug being adapted for engagement with said stud; and a second tube section, attached to said first tube section, comprising a tubular base having a flexible, expandable skirt hinged thereto.

7. An automotive suspension joint according to claim 6, wherein said skirt is expandable in a radially outward direction.

8. An automotive suspension joint according to claim 6, wherein said free end of said stud is threaded.

9. An automotive suspension joint according to claim 8, wherein said first tube section further comprises teeth extending radially inwardly from the inner wall of said first tube section for engaging said threaded portion of said stud.

10. An automotive suspension joint according to claim 6, wherein said plug is frangible, so as to allow said protective cover to be repositioned with respect to said seal and said skirt when said plug is separated from said first tube section.

11. A method for utilizing a protective cover in conjunction with an automotive suspension control arm and a joint having a stud with a free end projecting from a cavity and a seal between said cavity and said stud, comprising the steps of:

installing said protective cover upon said joint, in a first position defined by the engagement of a stop abutment incorporated in said protective cover with said stud, at the time said joint is assembled; and overriding said stop abutment so as to reposition said protective cover upon said joint in a second position defined by the engagement of a seal protection portion of said cover with said seal at the same time said joint is assembled into said suspension control arm.

12. A method according to claim 10, wherein said cover is repositioned to a location in which it contacts not only said joint but also said control arm.

13. A method according to claim 10, wherein said joint comprises a ball joint.

14. An automotive suspension ball joint, comprising:

a socket member including a cavity;

a stud having a threaded end projecting from said cavity and having a head contained within said cavity;

a boot seal engaged with said socket member and said stud; and a protective cover extending over both said stud and said seal, with said protective cover comprising a first tube section engaged with the threaded portion of said stud and including a frangible plug engaged with the threaded end of said stud and a second tube section attached to and integral with said first tube section and extending about said seal, with said second section comprising an expandable skirt adapted to splay outwardly about a portion of said socket and said seal when said protective cover is engaged with a sufficient length of said stud so as to separate said plug from said first section.

* * * * *